US008577082B2

(12) United States Patent
Thorpe et al.

(10) Patent No.: US 8,577,082 B2
(45) Date of Patent: Nov. 5, 2013

(54) SECURITY DEVICE AND SYSTEM

(75) Inventors: Jonathan Richard Thorpe, Abbots Barton (GB); Morgan William Amos David, Tilford (GB)

(73) Assignee: Sony United Kingdom Limited, Weybridge (GB)

( * ) Notice: Subject to any disclaimer, the term of this patent is extended or adjusted under 35 U.S.C. 154(b) by 1197 days.

(21) Appl. No.: 12/127,394

(22) Filed: May 27, 2008

(65) Prior Publication Data

US 2008/0317286 A1 Dec. 25, 2008

(30) Foreign Application Priority Data

Jun. 20, 2007 (GB) .................................. 0711956.3

(51) Int. Cl.
*G06K 9/00* (2006.01)

(52) U.S. Cl.
USPC ........... 382/103; 382/209; 382/190; 382/191; 382/118; 382/115

(58) Field of Classification Search
USPC ......... 382/224, 115–118, 155–161, 103, 209, 382/190, 191
See application file for complete search history.

(56) References Cited

U.S. PATENT DOCUMENTS

| | | | | |
|---|---|---|---|---|
| 6,961,703 | B1 | 11/2005 | Higgins et al. | |
| 7,227,893 | B1 | 6/2007 | Srinivasa et al. | |
| 2002/0154791 | A1 | 10/2002 | Onuma et al. | |
| 2003/0117279 | A1 | 6/2003 | Ueno et al. | |
| 2003/0151670 | A1 | 8/2003 | Calderwood | |
| 2006/0018516 | A1* | 1/2006 | Masoud et al. | 382/115 |
| 2006/0053342 | A1 | 3/2006 | Bazakos et al. | |
| 2006/0053459 | A1 | 3/2006 | Simerly et al. | |
| 2006/0228005 | A1 | 10/2006 | Matsugu et al. | |
| 2008/0258907 | A1* | 10/2008 | Kalpaxis | 340/539.1 |
| 2011/0181422 | A1* | 7/2011 | Tran | 340/573.1 |

FOREIGN PATENT DOCUMENTS

| | | | |
|---|---|---|---|
| CN | 1428963 | A | 7/2003 |
| EP | 1 324 290 | A2 | 7/2003 |
| GB | 2 427 319 | A | 12/2006 |
| GB | 2 433 173 | A | 6/2007 |
| JP | 10-285582 | A | 10/1998 |
| JP | 2003-256957 | A | 9/2003 |
| JP | 2007-140718 | A | 6/2007 |
| WO | WO 02/41273 | A1 | 5/2002 |
| WO | WO 2004/045215 | A1 | 5/2004 |
| WO | WO 2005/120071 | A2 | 12/2005 |
| WO | WO 2007/030168 | A1 | 3/2007 |

OTHER PUBLICATIONS

Potamianos et al: "Discriminative training of HMM stream exponents for audio-visual speech recognition", IEEE, 1998.*

* cited by examiner

*Primary Examiner* — Ruiping Li
(74) *Attorney, Agent, or Firm* — Oblon, Spivak, McClelland, Maier & Neustadt, L.L.P.

(57) ABSTRACT

A security device and system is disclosed. This security device is particularly useful in a security system where there are many security cameras to be monitored. This device automatically highlights to a user a camera feed in which an incident is occurring. This assists a user in identifying incidents and to make an appropriate decision regarding whether or not to intervene. This highlighting is performed by a trigger signal generated in accordance with a comparison between a sequence of representations of sensory data and other corresponding sequences of representations of sensory data.

25 Claims, 6 Drawing Sheets

SECURITY DEVICE AND SYSTEM

BACKGROUND OF THE INVENTION

1. Field of the Invention

The present invention relates to a security device and system.

2. Description of the Prior Art

Security systems having security devices are becoming increasingly popular. In general a security system is used to monitor a location or locations so that unwanted incidents are captured on video. Additionally, it is more common that the security systems are operated and monitored by security personnel who can address the incident in a timely fashion. A typical known security system can be used to monitor many rooms or locations. The setup of a security system in one room is described with reference to FIG. 1. A number of known security cameras 102 are installed in different positions around the room 100. Typically, the known security cameras 102 tend to be elevated and directed in such a way as to maximise the coverage of the room which is subject to the field of view of any one particular known security camera 102. In the prior art example of FIG. 1 there are three known security cameras 102 located around the room 100.

In order to monitor the room 100, the output feed from each known security camera 102 is fed into a known controller 104. The known controller 104 is usually located away from the room 100 and typically in a control centre. In reality, the known controller 104 will receive output feeds from many known security cameras located in many locations. In the control centre a known monitor 106 is provided which displays the output feed from each known security camera 102. The known monitor 106 is viewed by a security guard who, usually, is responsible for looking at the output feed from each and every known security camera 102.

When monitoring the output feed from three known security cameras 102, as in the present example, the task for the security guard is not so difficult. However, in most situations, many similar rooms or locations will be simultaneously monitored by the security guard and each room will be subject to different lighting conditions, different amounts of human traffic, etc. This means usually one security guard may be responsible for viewing and monitoring the output feeds of many tens if not hundreds of known security cameras. This means that the security guard may not witness an incident and thus not respond to such an incident in a timely fashion.

A typical known monitor 106 screen is shown in FIG. 2. As is seen in FIG. 2, the most common arrangement has the identity of the known security camera 102 labelled on each output feed. This identity could be the location of the known security camera 102 or could be a number, as is shown in the example of FIG. 2. It is common for the output feeds of the known security cameras 102 to be ordered on the monitor 106 by location or in increasing or decreasing numerical order. In the example of FIG. 2, the output feed is ordered in increasing numerical order.

As can be seen from FIG. 2, where N output feeds are shown, not only is there a very large number of output feeds for the security guard to monitor, but each output feed is small in size meaning that each output feed is more difficult to view.

The present invention therefore aims to address these above issues.

SUMMARY OF THE INVENTION

According to one aspect of the present invention, there is provided a security device comprising comparing means operable to compare a sequence of representations of sensory data captured from a location under surveillance with other corresponding sequences of representations of sensory data; generating means, operable in response to the comparison, to generate a trigger signal; a representation generating means operable to generate a feature vector representation of the sensory data, and an anomaly indicating means operable to generate an anomaly value, indicating the difference between each feature vector in the sequence and each feature vector in the corresponding sequence, in accordance with the Euclidian distance between the said feature vectors and wherein the generating means is operable to generate the trigger signal in accordance with the anomaly value.

This is advantageous because the generation of the trigger signal may allow the security system to automatically monitor many locations. This reduces the number of security guards required. Moreover, the time to respond to an incident may be reduced because the security guard who is monitoring the surveillance of the location is made aware of an incident more quickly.

The comparing means may be operable to compare the sequence of representations with other corresponding sequences of representations captured over a predetermined time interval.

The security device may have the sensory data generated from at least one of image data, audio data and/or sensor input data captured from the location under surveillance.

The sensory data may be ground truth metadata.

The security device may comprise a feature vector reduction means operable to reduce the dimensionality of the generated feature vector using principle component analysis.

The security device may comprise means operable to generate a self organising map using the generated feature vector representations of the sensory data.

The corresponding sequence of representations of the sensory data may be updated in response to a user input.

The corresponding sequence of representations may be provided by business logic.

The business logic may be a Hidden Markov Model.

According to another aspect, there is a system couplable, over a network, to a security device as described above, the system comprising processing means operative to receive the representation of the sensory data and other data from at least one of image data, audio data and/or sensor input data associated with said representation of the sensory data, and to generate, in accordance with the received representation of the sensory data and the received other data, said predetermined sequence of representations, and means operative to transmit, to the security device, the generated predetermined sequence.

According to another aspect, there is provided a security system comprising a control means connected to at least one security camera, a monitor, an archive operable to store said representations of the captured material in association with at least one of corresponding image data, audio data and/or sensor input data and a security device described above.

In the security system, the control means may be operable to display, on the monitor, output feeds from the or each of said security cameras, wherein the prominence of the displayed output feed or feeds is dependent upon the trigger signal.

According to another aspect there is provided a security camera comprising an image capture means and a security device described above.

According to another aspect, there is provided a method of operating the system described above, wherein said predetermined sequence is generated in exchange for money or monies worth.

In this case, said money or monies worth may be paid periodically.

According to another aspect, there is provided a security monitoring method comprising comparing a sequence of representations of sensory data captured from a location under surveillance with other corresponding sequences of representations of sensory data, and in response to the comparison, generating a trigger signal; generating a feature vector representation of the sensory data and generating an anomaly value, indicating the difference between each feature vector in the sequence and each feature vector in the corresponding sequence, in accordance with the Euclidian distance between the said feature vectors and generating the trigger signal in accordance with the anomaly value.

The corresponding sequences may be captured over a predetermined time interval.

The sensory data may be generated from at least one of image data, audio data and/or sensor input data captured from the location under surveillance.

The sensory data may be ground truth metadata.

The method according may further comprise reducing the dimensionality of the generated feature vector using principle component analysis.

The method may further comprise generating a self organising map using the generated feature vector representations of the sensory data.

The corresponding sequence of representations of the sensory data may be updated in response to a user input.

The corresponding sequence of representations may be provided by business logic, and further the business logic may be a Hidden Markov Model.

According to another aspect, there is provided machine interpretable security data representing a sequence of representations of sensory data captured from a location under surveillance, the data being arranged to generate a trigger signal in response to the comparison of the security data with other corresponding sequences of representations of sensory data.

According to another aspect, there is provided a computer program comprising computer readable instructions, which when loaded onto a computer, configure the computer to perform a method described above.

According to another aspect, there is provided a storage medium configured to store the computer program as described above therein or thereon.

Other apparent features and advantages of embodiments of the present invention will become apparent and at least some are provided in appended claims.

BRIEF DESCRIPTION OF THE DRAWINGS

An embodiment of the present invention will now be described, by way of example only, and with reference to the accompanying drawings, in which.

DESCRIPTION OF THE PREFERRED EMBODIMENTS

Figure 2:
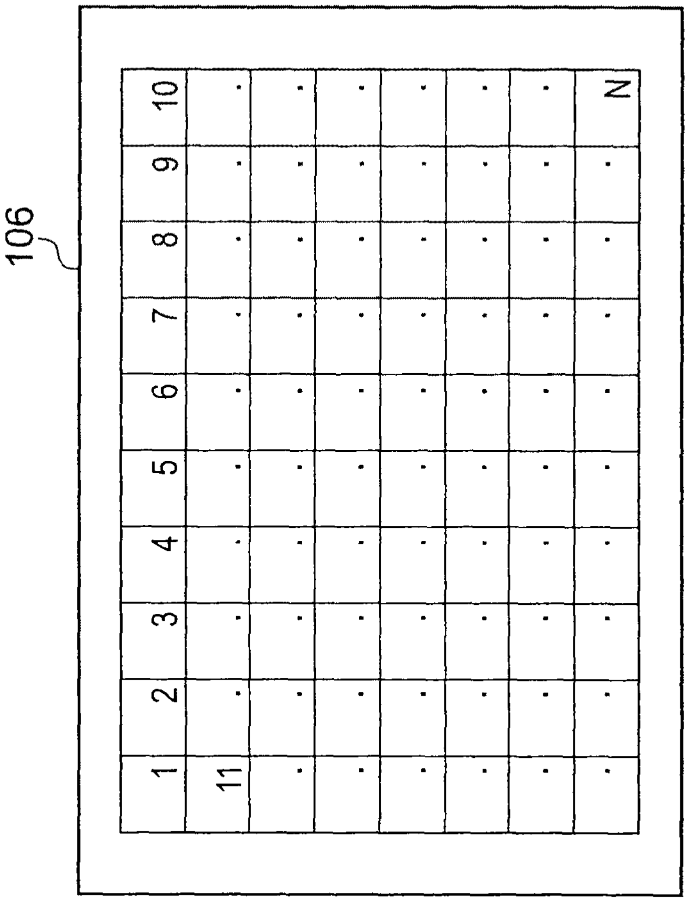
FIG. 2 shows a monitor having N output feeds from respective security cameras in the known security system of FIG. 1.
Figure 1:
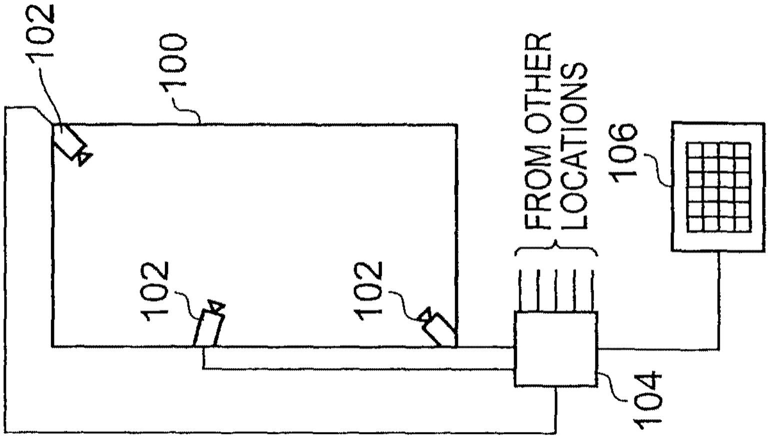
FIG. 1 shows an overhead view of a known security system located in a room.
Figure 3:
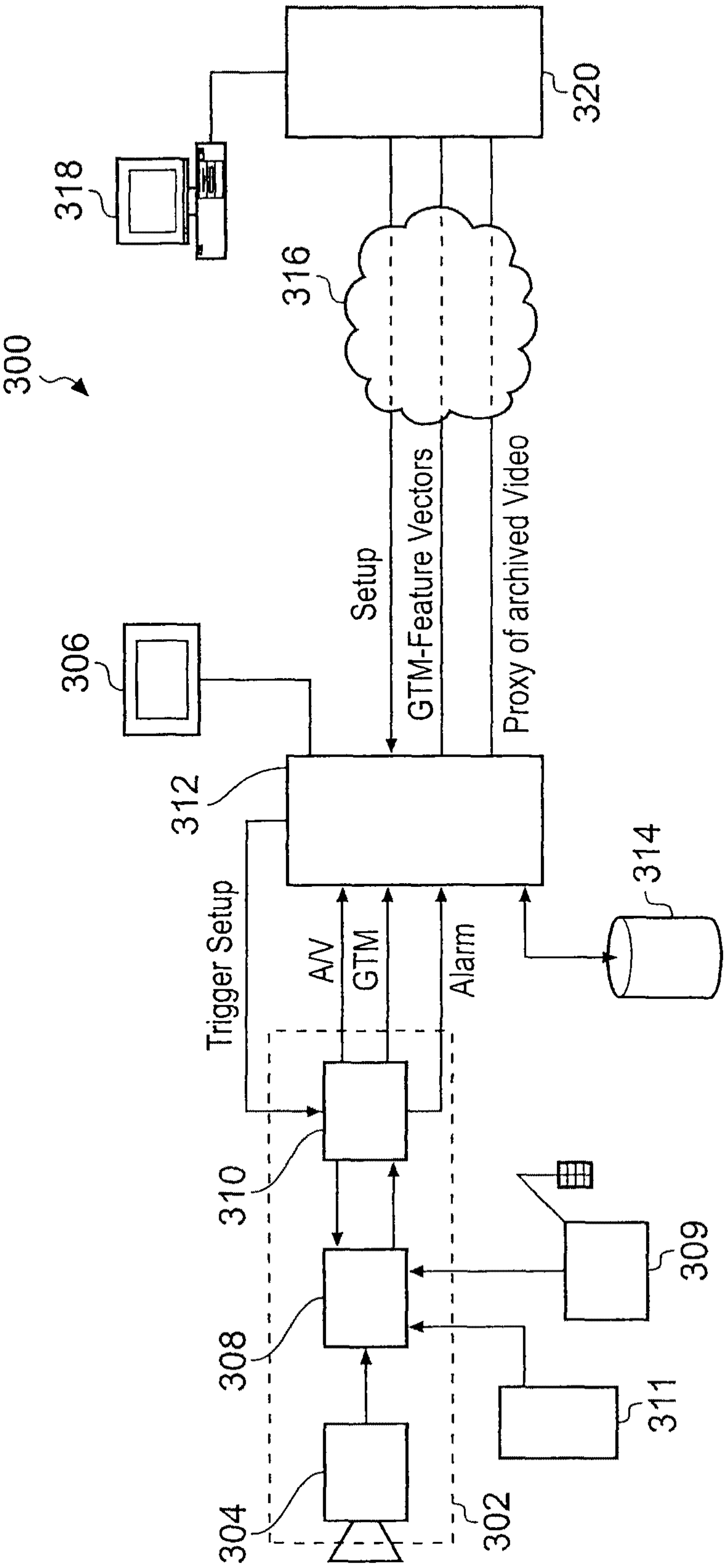
FIG. 3 shows a security system according to an embodiment of the present invention.

A security system 300 according to one embodiment of the present invention is described with reference to FIG. 3. Broadly speaking, the security system 300 according to one embodiment can be broken down into three parts; a security camera 302, a monitor system 312 and a security maintenance system 320. Each of these parts will be described separately. For illustrative purposes, the security camera 302 of one embodiment will be located in a position similar to that of the known security camera described in relation to FIG. 1. In other words, the security camera according to one embodiment will be positioned to provide surveillance of a particular location, such as a room. Further, the monitor system 312 may be located in a control centre and may receive output feeds from a number of the security cameras 302 of an embodiment of the present invention or known security cameras or a combination of the two.

The security camera 302 in one embodiment contains a camera unit 304, a feature vector generator 308 and an anomaly value and trigger generator 310.

The camera unit 304 contains a lens unit and a light detector (not specifically shown). The lens unit focuses light imparted thereupon onto the light detector. The lens unit allows the security camera 302 to have a specified field of view. The light detector converts the focused light into an electrical signal for further processing. The light detector may be a Charge Couple Device (CCD) or another similar device. In this embodiment, the light detector is a colour light detector although it is possible that the light detector may equally be a black and white detector. The mechanism by which the light is captured and focused onto the CCD is known and will not be described any further.

The output feed from the camera unit 304 is fed into the feature vector generator 308. The feature vector generator 308 generates feature vectors of certain features of the images from the output feed of the camera unit 304. A feature vector is, for example, generated and is representative of extracted features of a particular frame of video. A feature vector may also be generated and be representative of extracted features of any sensory data (including, but not limited to audio, textual or data from sensor inputs) which relate to the location under surveillance. In other words, the feature vector, in one embodiment, is thus a vector that is an abstract representation of one or more descriptors of sensor data relating to a location under surveillance. For example, a feature vector can be generated to represent either the hue of or shapes in a particular frame or frames of video. The sensory data may be captured and processed in real-time or may be archived data.

Figure 4:
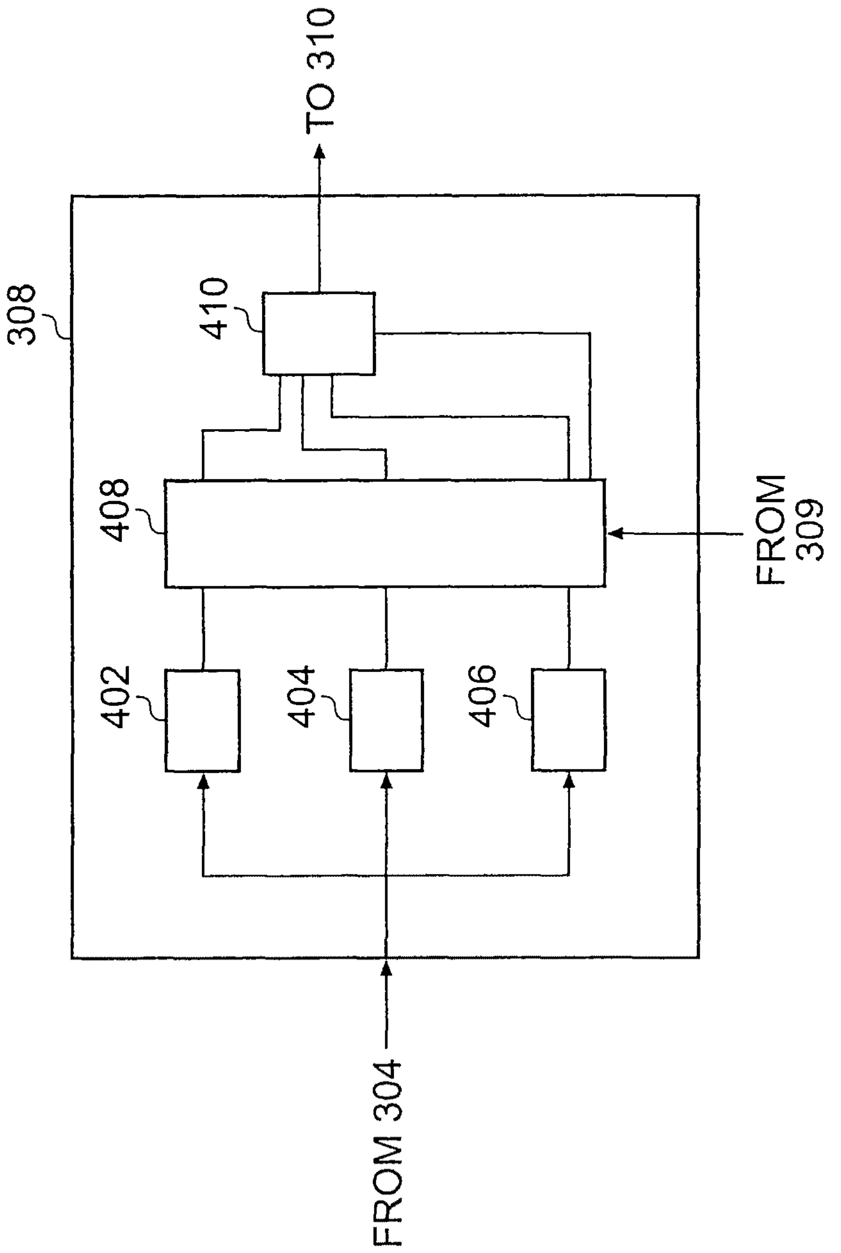
FIG. 4 shows a more detailed block diagram of the feature vector generator of FIG. 3.

Also fed into the feature vector generator 308 are outputs from an audio descriptor generator 309 and other sensor descriptor generators 311. The function and operation of which will become apparent from the description of FIG. 4 provided later.

The feature vector generator 308 generates feature vectors representative of different ground truth metadata associated with the output feed from the camera unit 304. Although ground truth metadata is a conventional term of the art, ground truth metadata in this context is metadata (which is data about data and is usually smaller in size than the data to which it relates) that allows reliable and repeatable results for frames of video, audio and/or any other sensory data. In other words, ground truth metadata provides a deterministic result for each frame of video, audio and/or other sensory data and so the result does not vary between frames of video or samples of audio and/or other sensory data. Examples of ground truth metadata which describe the video are a hue histogram, a shape descriptor or a colour edge histogram. An example of ground truth metadata for audio is pitch detection.

The feature vector generator 308 will now be described with reference to FIG. 4.

The feature vector generator 308 in this embodiment includes a hue histogram generator 402, a shape descriptor generator 404 and a motion descriptor generator 406. The output feed from the camera unit 304 is fed into the hue histogram generator 402, the shape descriptor generator 404 and the motion descriptor generator 406. The hue histogram generator 402 generates a feature vector representing the hue of a particular frame of video from the output feed of the camera unit 304. The shape descriptor generator 404 generates a feature vector representing the shapes in a particular frame of video. Also, the motion descriptor generator 404 generates a feature vector representing the motion between consecutive frames of video.

It should be noted that in the case of the motion between consecutive frames of video, the previous frame is stored in memory (not shown) in the motion descriptor generator 404 and compared with the current frame to identify the motion between the frames. The motion is then analysed and a feature vector generated representative of the motion.

As the general procedure for generating feature vectors representing hue and shapes in a frame of video and motion between frames of video is known, no explanation of this procedure is provided hereinafter.

The feature vector generated in each of the hue histogram generator 402, the shape descriptor 404 and the motion descriptor 406 is typically a (200×1) vector. In order to process these feature vectors in an efficient manner, it is desirable to reduce the size of each of the feature vectors. In order to perform such a reduction, these feature vectors are fed into a feature vector reduction device 408. Also fed into the feature vector reduction device 408 are feature vectors representative of other descriptors such as audio descriptors from the audio descriptor generator 309 and other descriptors from the sensor descriptor generator 311 such as, motion sensor descriptors, pressure pad descriptors, vibration descriptor etc. It should be noted here that the audio descriptor generator 309 is arranged to generate feature vectors in a similar manner to that described with reference to the hue histogram generator 402, the shape descriptor 404 and the motion descriptor 406. Also, motion sensor descriptors, pressure pad descriptors and vibration descriptors are binary-type descriptors; they are either on or off. However, this type of information, although useful, can be improved by describing the "on/off" pattern over a given period of time, for instance. Thus the feature vector generated by the sensor descriptor generator 311 will describe the pattern of "on/off" operations of the motion sensor, pressure pad and vibration detector. This gives a sensor indication of motion, pressure and vibration over time, and thus also provides sensory data. With regard to the sensory descriptors, it is anticipated that these will be coded as a floating point number so as to give some historical context to the results obtained from the sensor descriptors. In other words, the coding of the sensor descriptor may give information indicating how many times over the past two minutes the sensor has been activated. This provides a sensory indication to the system of the location under surveillance. In order to allow such historical information to be collected, a buffer will be provided to store the binary output from the sensor over a predetermined period (in the above case, the predetermined period is two minutes). The buffer will then output the number of times the sensor has been activated during this time, and the sensory descriptor will be coded on this basis.

Although the audio descriptor generator and the sensor descriptor generator 311 are shown to be separate to the security camera 302, it is envisaged that the security camera 302 can generate the required feature vectors from appropriate raw inputs from a microphone (audio), Passive InfraRed Sensors (PIRs) (motion), pressure pads, and/or mercury switches (vibration).

As the subsequent processing of each of the feature vectors in this embodiment of the present invention is the same, only the processing of the hue feature vector will be explained hereinafter for brevity.

The feature vector reduction device 408 reduces the size of the feature vector using, in an embodiment, principle component analysis (PCA). PCA is a known mathematical technique that establishes patterns in data allowing the data to be reduced in dimensionality without significant loss of information. In order for the PCA technique to be applied, a PCA matrix for the hue feature vector needs to be established. The PCA matrix is established during a "training phase" of the security system 300 after the security camera 302 has been located. As will be explained with regard to the "training phase" later, a PCA matrix is, in one embodiment, generated for a particular period of time during the day. Specifically, a PCA matrix is generated for one hour intervals during the day and so for each descriptor there will be 24 PCA matrices associated with that descriptor. The generation of the PCA matrix is a generally known technique. However, in embodiments of the present invention, the variances of each of the components of the vector resulting from the hue feature vector when multiplied by the PCA matrix are analysed. From the variance of these components, it is possible to determine where to truncate the resultant feature vector. In other words, it is possible to determine where to truncate the number of dimensions of the feature vector whilst retaining the salient features of the original feature vector.

After the "training phase" of the security system 300, a feature vector of reduced dimensionality is generated as a result of the multiplication of the PCA matrix with the feature vector of the hue descriptor. The use of the PCA technique means that the feature vector having reduced dimensionality retains the salient features of the original feature vector. In most cases, the 200 dimension feature vector is reduced to around 10 dimensions. This allows easier and more efficient processing of the feature vector.

The skilled person will appreciate that although PCA is used in this embodiment to reduce the dimensionality of the original feature vector, many other applicable mathematical techniques exist such as random mapping or multi-dimensional scaling. However, PCA is particularly useful because the dimensionality of the feature vector is reduced without significant loss of information.

The reduced dimension feature vector for, in this example, the hue descriptor is fed into a concatenater 410. Also fed into the concatenater 410 are the reduced dimension feature vectors of the shape descriptor, motion descriptor, audio descriptor and sensor descriptor. The concatenater 410 generates a composite feature vector by appending each reduced dimension feature vector together to generate a concatenated feature vector representative of the overall sensory measure of the location under surveillance. This is because the concatenated feature vector is an abstract representation of the entire area under surveillance.

The concatenated reduced dimension feature vector is used to determine whether there is an anomaly present in the area under surveillance. In other words, the concatenated reduced dimension feature vector, which provides a sensory measure of the area under surveillance at any one time, is compared to the "normal" sensory measure at the location under test. The difference between the sensory measure of the location under surveillance and the "normal" sensory measure will be a floating point value, and will be referred to hereinafter as an anomaly value. If the anomaly value is above a threshold value, then an anomaly is deemed to exist in the location. Having the anomaly value as a floating point value allows a certain degree of ranking to take place between anomalies from different security cameras 302. For instance, although output feeds from two or more security cameras may be anomalous, it is possible, with the anomaly value being a floating point value, to determine which camera is showing the scene with the highest degree of anomaly. This allows the output feed showing the highest degree of anomaly to take precedence over the other feeds in the monitor system 312. In order to determine what is "normal", the security system 300 is trained during the training phase noted above.

It is anticipated that the concatenated reduced feature vector will be generated periodically. In embodiments, the concatenated reduced feature vector will be generated every 40 ms although other periods such as 20 ms or 60 ms or any other suitable time period are also possible.

The purpose of the training phase of the security system allows the security system 300 to know what is "normal" for any given location under surveillance at any given time during the day. Therefore, for each security camera 302, audio descriptor and sensor descriptor, a PCA matrix for any given period during the day is generated. In one embodiment, the PCA matrix is generated over a period of one hour and so for any particular day, 24 PCA matrices, one for each hour timespan, will be generated. As noted earlier, the generation of the PCA matrix for each period of the day is known and so will not be described hereinafter.

For many locations, for any given period of time, what is considered "normal" may vary depending on the day of the week. For example, if the security system 300 monitors an office environment, during 3 pm and 4 pm on a week day, there may be much movement as staff walk around the office environment. However, at the weekend, there will be very little, if any, movement around the office as members of staff are not at work. Indeed, if the security system 300 detected much movement during the weekend, this would probably result in a high anomaly value and if above the anomaly threshold, would be considered an anomaly. Accordingly, there may be required separate training phases of the security system for different days of the week as well as different time periods during any one particular day. For ease of explanation, the training of only day will be explained.

Along with the PCA matrix, the security system 300 needs to know what is considered a "normal" feature vector or sequence of feature vectors in order to calculate the anomaly value and thus, whether an anomaly exists during active operation of the security system, or to put it another way, when a feature vector is tested against the "normal" model. The anomaly value is calculated in the anomaly value and trigger processor 310. During the training phase, the concatenated reduced feature vectors for each time span are stored in an archive 314. In addition to the concatenated reduced feature vectors, actual raw data (input video, audio and sensor information) corresponding to the concatenated reduced feature vectors is stored. This information is fed into a processing system 312 from camera unit 304 and the feature vector generator 308 via the anomaly value and trigger processor 310. This will assist in determining triggers which are explained later.

During the training phase, a self organising map for the concatenated feature vector is also generated. The self-organising map will be generated in the anomaly value and trigger processor 310, although this is not limiting. The self organising map allows a user to visualise the clustering of the concatenated feature vectors and will visually identify clusters of similar concatenated feature vectors. Although the generation (or training) of a self organising map is known, a brief explanation follows with reference to FIGS. 5 and 6.

Figure 5:
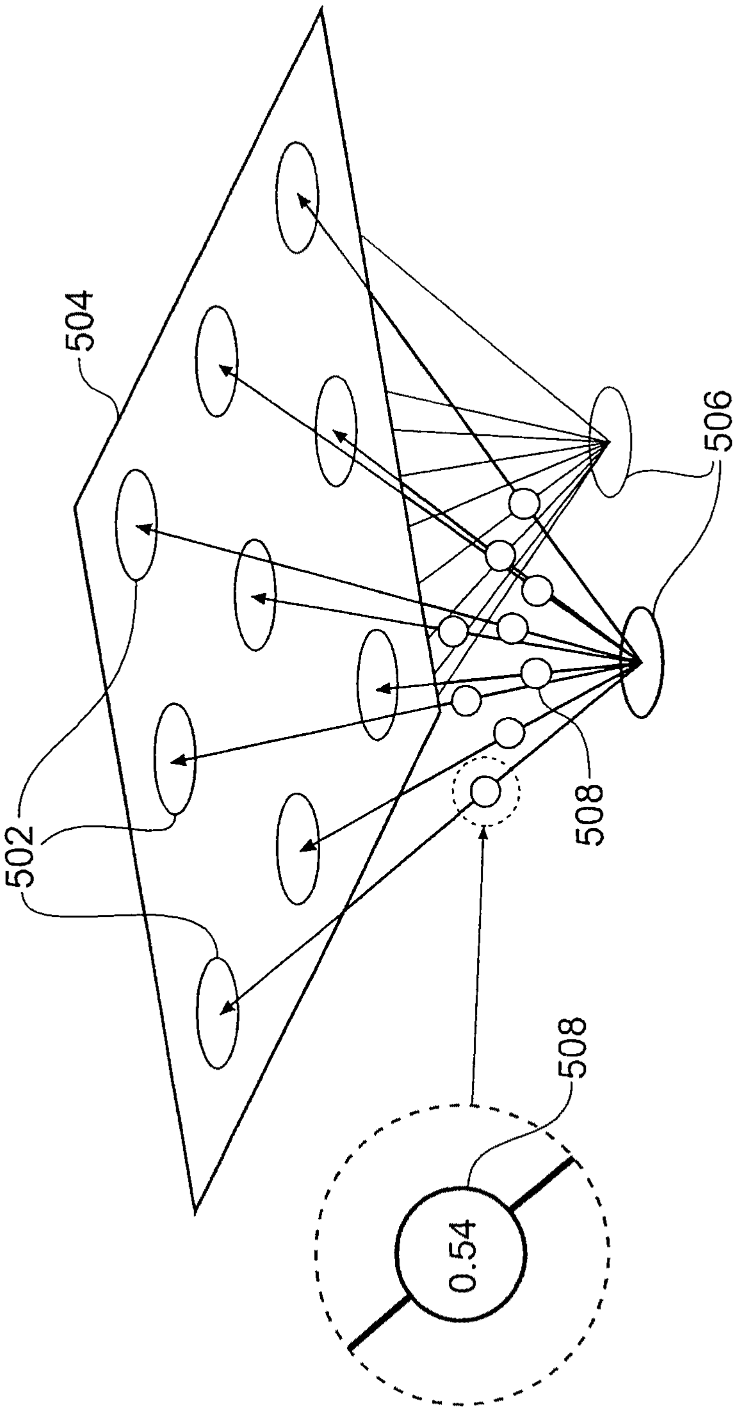
FIG. 5 shows the construction of a Self Organising Map which is used to visualise the feature vectors generated in the feature vector generator of FIG. 3.

In FIG. 5, a self-organising map consists of input nodes 506 and output nodes 502 in a two-dimensional array or grid of nodes illustrated as a two-dimensional plane 504. There are as many input nodes as there are values in the feature vectors being used to train the map. Each of the output nodes on the map is connected to the input nodes by weighted connections 508 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights associated with each of the output nodes.

The closest node, identified by the smallest Euclidean distance between the input vector and the weights associated with that node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, the concatenated feature vector under test can be presented to the map to see which of the output nodes is closest to the concatenated feature vector under test. It is unlikely that the weights will be identical to the feature vector, and the Euclidean distance between a feature vector and its nearest node on the map is known as its "quantisation error".

By presenting the concatenated feature vector to the map to see where it lies yields an x, y map position for each concatenated feature vector. Finally, a dither component is added, which will be described with reference to FIG. 6 below.

A potential problem with the process described above is that two identical, or substantially identical, concatenated feature vectors may be mapped to the same node in the array of nodes of the SOM. This does not cause a difficulty in the handling of the data, but does not help with the visualisation of the data on display screen. In particular, when the data is visualised on a display screen, it has been recognised that it would be useful for multiple very similar items to be distinguishable over a single item at a particular node. Therefore, a "dither" component is added to the node position to which each concatenated feature vector is mapped. The dither component is a random addition of ±½ of the node separation. So, referring to FIG. 6, a concatenated feature vector for which the mapping process selects an output node 600 has a dither component added so that it in fact may be mapped to any map position around a node 600 within the area 602 bounded by dotted lines on FIG. 6.

Figure 6:
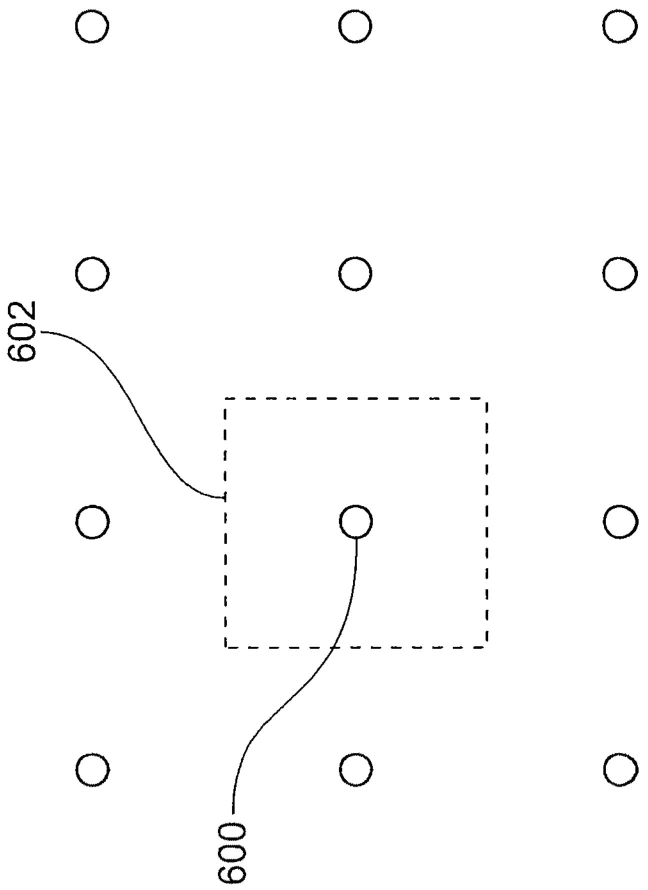
FIG. 6 shows a displayed Self Organising Map constructed in FIG. 5.

So, the concatenated feature vector can be considered to map to positions on the plane of FIG. 6 at node positions other than the "output nodes" of the SOM process.

Although the self organising map is a useful tool for visualising clustering of concatenated reduced feature vectors and so indicating whether or not a feature vector applied to the self organising map is within a normal cluster, because of the processing required to place the concatenated reduced feature vector into the self-organising map, it is useful to calculate the anomaly value using the concatenated reduced feature vector data which is not included in the self-organising map. However, it is also possible to calculate the anomaly value using the self-organising map as explained below.

In order to determine if the concatenated reduced feature vector which is generated when the security system 300 is active shows an anomaly, the Euclidean distance between the concatenated feature vector under test and the trained set of concatenated feature vectors is determined. This is a similar measure to the quantisation error described with respect to the self-organising map and the quantisation error represents the anomaly value. Thus, if the Euclidian distance is above a threshold, an anomaly is deemed to exist.

A self-organising map may be generated for each time-span for which the security system 300 is trained. Additionally, or alternatively, the same or different self-organising map may be generated for the concatenated feature vector over an entire typical day.

As the concatenated feature vectors are generated every 40 ms it is unlikely that an anomaly value generated from one feature vector would be sufficiently large to constitute a situation which may be considered to be a breach of security or an incident of which the security guard needs to be made aware. This means that the anomaly value indicated by one feature vector does not in itself determine whether or not the trigger signal is generated. The anomaly value is an indication of the degree of how much one scene from one location varies from the "normal" scene from the same location. However, a trigger is a situation to which a security guard should be notified. If the anomaly value for one scene is above a threshold, for over say 10,000 concatenated feature vectors (which is 400 seconds, if the concatenated feature vectors are generated at a rate of one every 40 ms), then a trigger signal may be generated. However, it may not be necessary that every concatenated feature vector generates an anomaly value over that threshold in order to generate the trigger signal. It may be for instance that only 80% of concatenated feature vectors over a particular period need to exceed the anomaly threshold value for the trigger signal to be generated. To put it another way, in this case, the trigger signal is generated in response to a sequence of comparisons between the concatenated feature vector of the location under surveillance and the concatenated feature vector generated when the system was being trained at the corresponding time.

Figure 7:
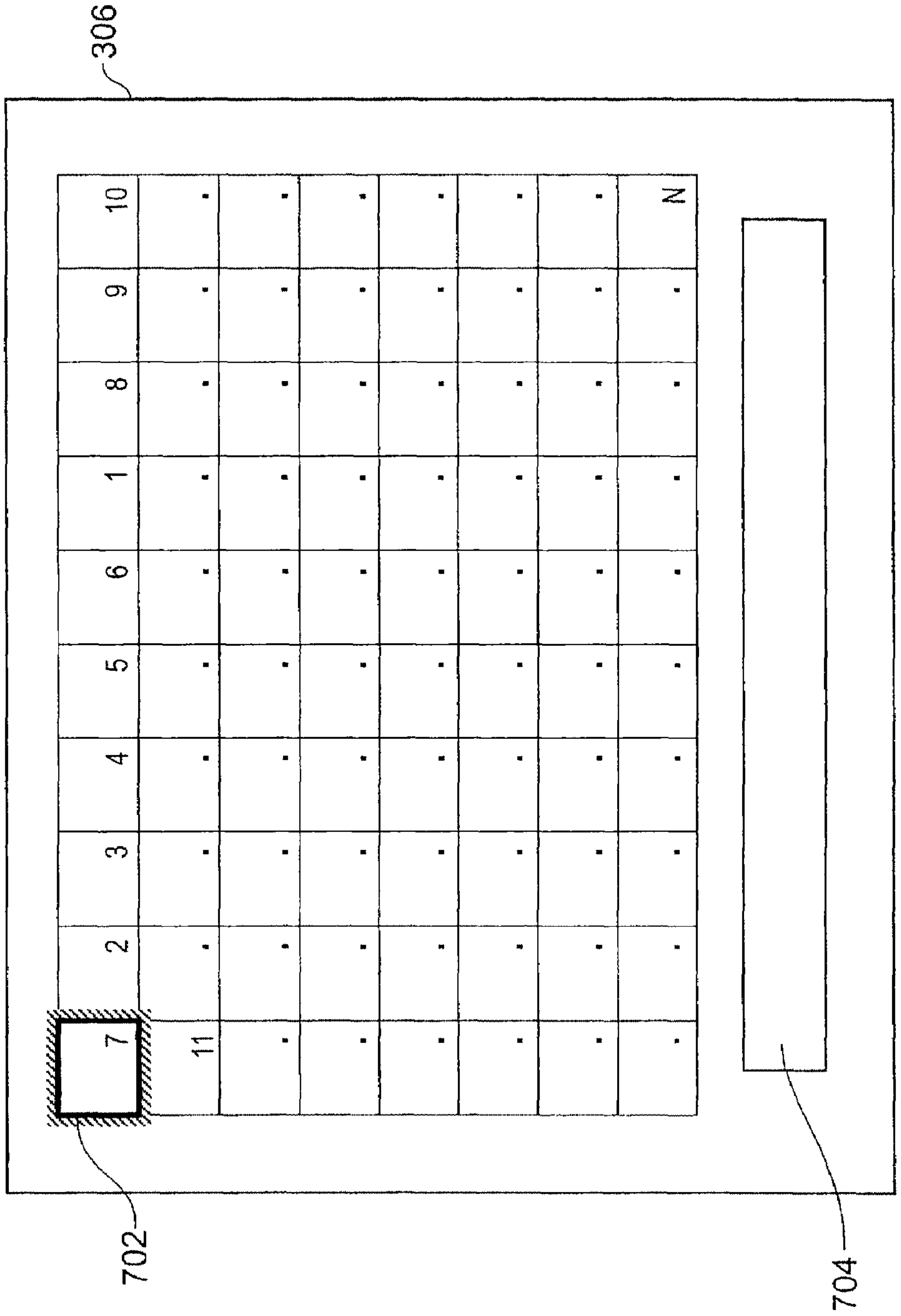
FIG. 7 shows monitor displaying the output feeds from the security system of FIG. 3.

When a trigger signal is generated, the trigger signal is fed to the monitor system 312. The trigger signal notifies to the monitor system 312 that a situation is occurring at the location under the surveillance of the security camera 302 of which the security guard monitoring the output feed of the security camera 302 should be made aware. In response to the trigger signal, the processor 306 notifies the security guard of the situation, and assists in identifying the location. In one example, the output video feed from security camera 302 may be outlined by a flashing border 702 as shown in FIG. 7. Also, as shown in FIG. 7, it may be advantageous to provide the output feed of security camera 302 in a more prominent position, either, as is shown in FIG. 7, by moving the output feed to the top left hand corner of the screen of monitor 306 or, as not shown, by enlarging the output feed to fill all or a greater proportion of the monitor 306. In fact, any mechanism by which the output feed is made more prominent is envisaged.

Although as noted above the duration for which the anomaly value exceeds a threshold value determines whether a trigger signal is generated, in one embodiment, other measures may be used to generate the trigger signal. For example business logic such as a Hidden Markov Model (HMM) may be used to model a certain sequence of events as defined by the feature vectors. In the HMM, a temporal sequence of feature vectors and are used to model a sequence of events. For instance, violent disorder on a street may have a certain hue and motion characteristic followed by high audio power, which, in turn, is followed by certain other motion characteristics. It is important to note that these characteristics by themselves may or may not have an anomaly value that exceeds the anomaly threshold value. In other words, the individual characteristics by themselves may or may not indicate an anomaly in the scene. The HMM would analyse the feature vectors and would output a probability value indicating the probability that a fight is occurring on the basis of the HMM and the characteristic feature vectors. If the probability is above a certain probability threshold, a trigger signal would be generated. In the trigger signal of one embodiment, details of the type of incident (which in this case is a fight) would also be provided, although this is not necessary. It is envisaged that the HMM would model many different incidents, for example left luggage on a station platform, depending on the location under surveillance. It is explained later how these different HMMs are provided to the security system 300. In one embodiment, it is envisaged that for each different HMM which models a different incident, a different ranking, indicating the prominence that each incident should be given, will be attributed to each incident. For example, in the two incidents explained above, the fight would be given a higher prominence than left luggage because of the urgency of the required response. In this case, it is particularly useful if the trigger signal includes the indication of the type of incident as this allows the prominence to be determined. Alternatively, the trigger signal could indicate the level of prominence the incident should have instead of details of the incident. This would potentially reduce the amount of data needing to be transferred around the security system 300.

The business logic may be generated at production of the security camera 302.

Additionally, in order to take account of the location of the security system, the business logic, in one embodiment, can be updated in two distinct ways using a trigger setup signal from the monitor system 312 to the anomaly value and trigger processor 310. This allows the security system 300 to become part or fully tailored to a specific location. Firstly, the business logic can be updated by feedback from the security guard. In this situation, as the concatenated feature vectors and corresponding raw input sensory data are stored in the archive 314, if the security guard notices a new incident on his or her monitor 306 to which he should be made aware, he or she can activate the trigger setup signal. The trigger setup signal can be stored in the archive 314 and/or the archive 314 of raw sensory data will be played back to the security guard on the monitor 306. The security guard can then establish the start and end points of the incidents. The security guard would use a toolbar 407 positioned under the output feeds of the security cameras on monitor 306 in order to control the input data and generate the trigger signal. The feature vectors generated from the raw sensory data of this defined situation can be used by the business logic to define a new trigger condition. However, this method of updating will require a skilled security guard and will also take up a large proportion of time restricting the effectiveness of the security guard in dealing with other incidents. This is because the security guard is not able to monitor the other security cameras in the system as closely whilst generating the trigger signal.

In a second situation, the trigger setup signal is defined remotely to the security system 300. In this embodiment, the trigger setup signal generated by the security guard which is stored in the archive 314 is used as a flag so that raw data which is in the vicinity of the flag (i.e. temporally before and after the incident) is a proxy version of the archived material. In other words, raw data which is a predetermined time before and after the flag is stored separately as proxy data. The proxy data may include video, audio and/or sensor data.

In this embodiment, the proxy data is transferred, in addition to the associated feature vectors and associated raw data over a network 316 to the security maintenance system 320. The network 316 may be the Internet, a cellular network, a local area network or some other network which is remote to the monitor system 312. The security maintenance system 320 is used to generate the trigger update signal as will be explained hereinafter. Although it is actually possible to transfer all of the raw data along with the concatenated feature vectors, the skilled person would appreciate that such a transfer would use large amounts of network capacity and there may be an additional worry to the operator of the security system 302 that providing so much surveillance data may compromise the security of the system. It is therefore useful to transfer only the proxy data and the feature vectors, and the raw data associated with the proxy data to the security maintenance system 320.

At the security maintenance system 320, in this embodiment, a highly skilled person may view the proxy data and identify start and stop locations within the raw data that best describe the start and stop of the situation respectively. The highly skilled person would interact with the remote processor 320 using terminal 318. From this information, the business logic can be derived. After the business logic for the trigger has been derived, it is transferred back to the processor 312 via the network 316. The trigger update signal is fed from processor 312 to the anomaly and trigger processor 310. It is envisaged to increase the security of the system, the proxy data, the concatenated feature vectors, the anomaly value and the trigger update signal are transferred over a secure layer in the network 316.

Additionally, although it is advantageous to transfer just the proxy data, it is also possible that all the raw data is transferred. In this case, there is no requirement for the security guard sat at monitor 306 to interact with the system 300 at all. Indeed, in this case, the expert sat at terminal 318 can generate all the trigger update signals from viewing the raw data in accordance with requirements set down by the operators of the security system 300. In other words, the operators of the security maintenance system 320 would work with the operators of the security system 300 to generate a list of criteria which would cause triggers. The highly skilled person sat at terminal 318 would then review all the raw data to find such situations and would thus generate trigger update signals complying with the requirements set down by the operators. It is envisaged that if such situations cannot be found on the raw data, different raw data provided from other sources may be used to generate such business logic. The other sources may be archived footage from the same security system 300 or different security systems operated by the same operating company or freely available footage. It is unlikely, although still possible, that security footage from security systems operated by different companies would be used as this may be seen as compromising the security of the other company.

Further, the supplier of the security system 300 may also be the operator of the remote processor 320. In this case, the purchaser of the security system 300 can be offered different levels of service. Firstly, the security system 300 may be a system that uses the anomaly value exceeding the threshold only to generate the trigger signal. Specifically, in this case, the length of time of such an anomaly value exceeding the predetermined threshold being used to generate the trigger. In addition to this level of service, the purchaser may be offered the facility to allow the security guard to generate triggers and the security guard to review the data to refine the business logic in the system. In addition or as an alternative to this level of service, the purchaser may be offered the facility to have the business logic further improved by having highly skilled operators of terminal 318 review the proxy data generated in accordance with the guard implemented trigger signal. As an improved alternative, the purchaser may wish to have the highly skilled operator review all the raw data and generate triggers and business logic in accordance with certain criterion or criteria set down by the purchaser. It is envisaged that the purchaser will pay different amounts of money for the different levels of service. Further, it is envisaged that the services involving the generation of business logic and/or trigger update signals will be a subscription based service. In other words, the purchaser needs to pay a subscription to the operator of the remote processor to maintain the level of service. Also, it is possible that the operator may wish to pay a "one-off" fee and ask the operator of the remote processor 320 to provide such a service once.

It is envisaged that insofar as parts of the above embodiments are implemented on a processor capable of reading computer instructions, many of the features of the above embodiments will be carried out using a computer program containing such instructions. The computer programs it is envisaged will be stored on a storage medium or media that may be random access memory (RAM), optical readable media, magnetic reading media or as signals for transfer over a network such as the Internet.

Also, although the above has been described with the feature vector generator 308 and the anomaly value and trigger processor 310 being located in the security camera 302, the skilled person will appreciate that the invention is not so limited. In this case, if these are located outside of the security camera 302, the system 300 could be applied to presently installed security systems 300. Finally, it is possible that the security system will record image data only when the trigger signal is generated. This reduces the amount of material that the system has to store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention defined by the appended claims.

We claim:

1. A security device comprising:

a representation generating unit configured to generate different types of feature vector representations of both visual and non-visual sensory data captured from a location under surveillance;

a concatenating unit configured to generate a composite feature vector based on a combination of the different types of feature vector representations for both the visual and non-visual sensory data;

a comparing unit configured to compare a sequence of composite feature vector representations of the sensory data with other corresponding sequences of representations of the sensory data captured during a training phase;

a generating unit configured to generate, in response to the comparison, a trigger signal; and an anomaly indicating unit configured to generate, via a processor, an anomaly value indicating the difference between each composite feature vector in the sequence and each composite feature vector in the other corresponding sequence, in accordance with the Euclidian distance between the said composite feature vectors, wherein the generating unit generates the trigger signal when the anomaly value is greater than a predetermined threshold, the different types of feature vector representations include a hue histogram feature vector and at least one of a shape descriptor feature vector and motion descriptor feature vector, and the composite feature vector is a combination of at least two of hue histogram feature vectors, shape descriptor feature vectors and motion descriptor feature vectors.

2. A security device according to claim 1, wherein the comparing unit is operable to compare the sequence of representations with other corresponding sequences of representations captured over a predetermined time interval.

3. A security device according to claim 1, wherein the sensory data is generated from at least one of image data, audio data and/or sensor input data captured from the location under surveillance.

4. A security device according to claim 1, wherein the sensory data is ground truth metadata.

5. A security device according to claim 1, comprising a feature vector reduction unit operable to reduce the dimensionality of the generated feature vector representations using principle component analysis.

6. A security device according to claim 5, comprising a unit operable to generate a self organizing map using the generated feature vector representations of the sensory data.

7. A security device according to claim 1, wherein the corresponding sequence of representations of the sensory data is updated in response to a user input.

8. A security device according to claim 7, wherein the corresponding sequence of representations is provided by business logic.

9. A security device according to claim 8, wherein the business logic is a Hidden Markov Model.

10. A security system coupleable, over a network, to a security device according to claim 7, the security system comprising a processing unit operative to receive the representation of the sensory data and other data from at least one of image data, audio data and/or sensor input data associated with said representation of the sensory data, and to generate, in accordance with the received representation of the sensory data and the received other data, said corresponding sequences of representations, and a transmission unit operative to transmit, to the security device, the generated predetermined sequence.

11. A security system comprising a control unit connected to at least one security camera, a monitor, an archive operable to store said representations of the captured material in association with at least one of corresponding image data, audio data and/or sensor input data and a device according to claim 1.

12. A security system according to claim 11, wherein the control unit is operable to display, on the monitor, output feeds from each of said security cameras, wherein the prominence of the displayed output feeds is dependent upon the trigger signal.

13. A security camera comprising an image capture device and a security device according to claim 1.

14. A method of operating the system of claim 10, wherein said predetermined sequence is generated in exchange for money or monies worth.

15. A method according to claim 14, wherein said money or monies worth is paid periodically.

16. A security monitoring method comprising:

generating different types of feature vector representations of both visual and non-visual sensory data captured from a location under surveillance;

generating a composite feature vector based on a combination of the different types of feature vector representations from the both visual and non-visual sensory data;

comparing a sequence of composite feature vector representations of the sensory data with other corresponding sequences of representations of the sensory data captured during a training phase;

generating, and in response to the comparison, a trigger signal; and generating, via a processor, an anomaly value indicating the difference between each composite feature vector in the sequence and each composite feature vector in the other composite corresponding sequence, in accordance with the Euclidian distance between the composite feature vectors; and generating the trigger signal when the anomaly value is greater than a predetermined threshold, wherein the different types of feature vector representations include a hue histogram feature vector and at least one of a shape descriptor feature vector and motion descriptor feature vector, and the composite feature vector is a combination of at least two of hue histogram feature vectors, shape descriptor feature vectors and motion descriptor feature vectors.

17. A security monitoring method according to claim 16, wherein the corresponding sequences are captured over a predetermined time interval.

18. A method according to claim 16, wherein the sensory data is generated from at least one of image data, audio data and/or sensor input data captured from the location under surveillance.

19. A non-transitory computer-readable medium storing computer readable instructions thereon that when executed by a security device cause the security device to perform the method according to claim 16.

20. The security device according to claim 1, wherein the non-visual sensory data includes data generated from at least one of motion sensor descriptors, pressure pad descriptors and vibration descriptors.

21. The security device according to claim 2, wherein the trigger signal is generated only when the anomaly value is above the predetermined threshold for a predetermined number of composite feature vectors corresponding to representations captured over a predetermined time interval.

22. The security system according to claim 11, wherein one or more output video feeds contains a flashing border based on the trigger signal.

23. The security device according to claim 1, wherein the sensory data for a predetermined time both before and after generation of the trigger signal is stored as a sequence of raw proxy data.

24. The security device according to claim 1, wherein the different types of feature vector representations include the hue histogram feature vector, shape descriptor feature vector and motion descriptor feature vector, and the composite feature vector is a combination of the hue histogram feature vectors, shape descriptor feature vectors and motion descriptor feature vectors.

25. The security system according to claim 11, wherein display of one or more output video feeds in an array of video feeds is modified based on the trigger signal in order to indicate generation of the trigger signal for the said one or more output video feeds.

* * * * *